Feb. 15, 1927.

D. G. ASHTON 1,617,982

BELT TIGHTENING AND GUIDING DEVICE

Filed Sept. 9, 1925

D. G. Ashton INVENTOR

BY *Victor J. Evans*

ATTORNEY

WITNESS:

Patented Feb. 15, 1927.

1,617,982

UNITED STATES PATENT OFFICE.

DONALD G. ASHTON, OF CUSHING, OKLAHOMA.

BELT TIGHTENING AND GUIDING DEVICE.

Application filed September 9, 1925. Serial No. 55,381.

The object of this invention is to provide means for tightening a belt or guiding it away from any portion of a machine or construction which would tend to cause injury, by frictional contact, and to provide means for deflecting the belt at any angle desired.

A further object is to provide a device especially adapted for use in oil pumping machinery.

A still further object is to provide a device of the character indicated which shall include a roller or the like, means for rotatably mounting this element, and means whereby the roller may be moved to any angular position desired, and retained in that position.

With the foregoing and other objects in view, the invention consists in the novel construction and arrangement of elements described, illustrated and claimed, it being understood that modifications may be made within the scope of the claims without departing from the spirit of the invention.

In the drawings forming part of this application:

The tightening device per se is conveniently mounted between standards 10 and 12 supported at the points 13 and 14 on any suitable stationary object, or portion of a machine or other piece of apparatus.

Figure 1:
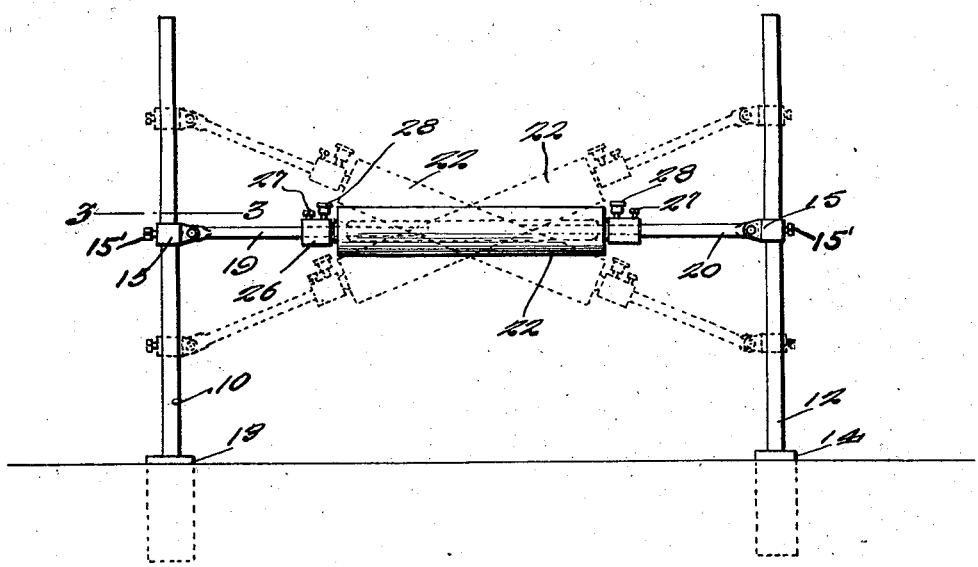
Figure 1 shows the device in elevation, the roller being in horizontal position, and being shown in dotted lines in other positions, at an angle with reference to the horizontal.
Figure 2:
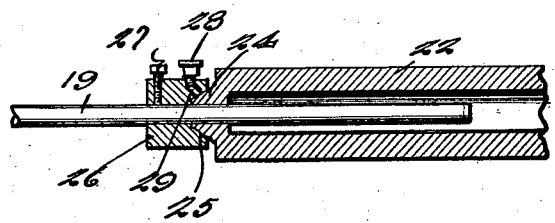
Figure 2 is a fragmentary view showing the roller or pulley in section and the mounting elements at one end thereof.
Figure 3:
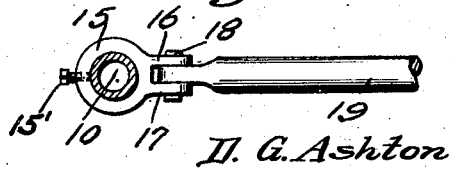
Figure 3 is a section on line 3—3 of Figure 1.

Carried by standards 10 and 12 are collars such as 15, one of these elements being shown in top plan in Figure 3. and illustrated in both Figures 1 and 3 as being provided with ears 16 and 17 and with retaining devices or set screws 15'. The ears are apertured and are adapted to receive a bolt or other securing device 18, by means of which the collars are pivotally connected with rods 19 and 20. These rods 19 and 20 extend toward each other, and in Figure 2 the manner of connection of rod 19 with the mounting means for the pulley, is illustrated.

A roller of suitable length, constituting in a sense a pulley, is designated 22, it being understood that this element may be of a length corresponding approximately with the width of the belt. The ends of roller 22 are formed with cone portions 24 one of which cooperates with flared bearing 25 of tubular element 26 mounted on rod 19, a similar element being carried by rod 20. Elements 26 are secured with reference to rods 19 and 20 by means of set screws 27. An oil cup, or grease cup, is designated 28, and a duct communicating with the cup and with the bearing is shown at 29.

When the set screws 27 are loosened, the tubular elements 26 constituting bearings, are adjustable and permit of the shifting of the roller with reference to the rods 19 and 20, and longitudinally thereof, so that any desired angular position may be secured when collars 15 are shifted on the vertical standards. This makes it possible to guide the belt away from any part of the apparatus tending to cause injury to the belt, and also permits of tightening the belt through upward or downward movement of the roller, or angular movement thereof.

Having thus described the invention, what is claimed as new, is:—

1. A device of the class described, comprising a plurality of spaced stationary elements, devices adjustable along said elements, to positions where the distance between them increases or decreases, rods pivotally connected with the adjustable devices and extending toward each other, the rods being relatively movable while maintaining alinement, bearings adjustably mounted on the rods, and a roller rotatably mounted between the bearings and having its axis in alinement with the rods.

2. A device of the class described, comprising a plurality of spaced stationary elements, collars slidable along said elements, means for securing the collars in an adjusted position, rods pivotally connected with the collars, bearing elements adjustably connected with the rods, said elements last named having bearing surfaces opposite each other, a roller positioned between the approaching ends of the bearing elements, and means for effecting adjustment of said bearing elements.

In testimony whereof I affix my signature.

DONALD G. ASHTON.